(12) United States Patent
Amacker et al.

(10) Patent No.: US 11,673,501 B2
(45) Date of Patent: Jun. 13, 2023

(54) MOBILE PLATFORM INCORPORATING A RAMP STRUCTURE

(71) Applicant: Toyota Research Institute, Inc., Los Altos, CA (US)

(72) Inventors: Matthew Amacker, Santa Clara, CA (US); Joseph Taylor, San Jose, CA (US); Gregory J. Klein, San Mateo, CA (US); Jonathan Yao, San Jose, CA (US); Andrew Custer, Oakland, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 683 days.

(21) Appl. No.: 16/663,818

(22) Filed: Oct. 25, 2019

(65) Prior Publication Data
US 2021/0122283 A1 Apr. 29, 2021

(51) Int. Cl.
| | | |
|---|---|---|
| *G01M 17/00* | (2006.01) | |
| *B60P 1/43* | (2006.01) | |
| *G01M 17/007* | (2006.01) | |
| *G05D 1/02* | (2020.01) | |

(52) U.S. Cl.
CPC ............. *B60P 1/43* (2013.01); *G01M 17/007* (2013.01); *G05D 1/0214* (2013.01)

(58) Field of Classification Search
None
See application file for complete search history.

(56) References Cited

U.S. PATENT DOCUMENTS

| | | | |
|---|---|---|---|
| 2,717,707 A | 9/1955 | Martin | |
| 3,871,129 A | 3/1975 | Tong | |
| 4,726,727 A * | 2/1988 | Tyler | B66F 7/246 188/4 R |
| 6,807,901 B2 | 10/2004 | Bentzinger et al. | |
| 10,568,786 B1 * | 2/2020 | Nunn | A61G 3/061 |
| 10,813,820 B1 * | 10/2020 | Buettgen | A61G 3/0833 |
| 2011/0217137 A1 * | 9/2011 | Benesch | B62D 63/08 410/4 |
| 2013/0018526 A1 * | 1/2013 | Kelly | G01M 17/0078 701/2 |
| 2014/0144207 A1 * | 5/2014 | Weber | G01M 17/0078 73/12.07 |
| 2015/0052693 A1 * | 2/2015 | Allen | B65G 69/28 14/71.1 |
| 2015/0217787 A1 * | 8/2015 | Luddeneit | G06Q 20/045 414/541 |
| 2018/0178703 A1 * | 6/2018 | Keck | B65G 67/00 |
| 2019/0247248 A1 * | 8/2019 | Perkins | A61G 3/061 |
| 2020/0017012 A1 * | 1/2020 | Perotti | B65G 69/30 |
| 2021/0018398 A1 * | 1/2021 | Amacker | G01M 17/0074 |
| 2021/0122295 A1 * | 4/2021 | Sato | B60R 3/02 |

* cited by examiner

*Primary Examiner* — James M McPherson
(74) *Attorney, Agent, or Firm* — Christopher G. Darrow; Darrow Mustafa PC

(57) ABSTRACT

A ramp structure for a mobile platform includes at least one ramp member structured to be operably coupled to the mobile platform. The at least one ramp member is structured to be deflectable toward a ground surface so as to form a ramp responsive to contact with a subject vehicle wheel when the ramp member is operably coupled to the mobile platform and the mobile platform resides on the ground surface. The ramp extends in a direction from the ground surface toward a top surface of the mobile platform.

4 Claims, 4 Drawing Sheets

_US 11,673,501 B2_

MOBILE PLATFORM INCORPORATING A RAMP STRUCTURE

TECHNICAL FIELD

The subject matter described herein relates to systems and methods, including guided mobile platforms and guided soft targets, for testing crash avoidance technologies.

BACKGROUND

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. A guided test platform may be utilized for testing vehicle technologies incorporated into a conventional passenger vehicle. The guided test platform may be structured to simulate aspects of a conventional vehicle so that a conventional passenger vehicle (or subject vehicle) may contact the guided test platform in a collision scenario. The guided test platform may be designed so that the subject vehicle may collide with and drive over the top of the guided test platform without damage to either the test platform or the subject vehicle. This enables the testing of various technologies incorporated into the subject vehicle with minimal vehicle damage and no injury to personnel.

SUMMARY OF THE INVENTION

In one aspect of the embodiments described herein, a ramp structure for a mobile platform is provided. The ramp structure includes at least one ramp member structured to be operably coupled to the mobile platform. The at least one ramp member is structured to be deflectable toward a ground surface so as to form a ramp responsive to contact with a subject vehicle wheel when the ramp member is operably coupled to the mobile platform and the mobile platform resides on the ground surface. The ramp extends in a direction from the ground surface toward a top surface of the mobile platform.

In another aspect of the embodiments described herein, a guided test platform is provided. The guided test platform includes a ramp structure having at least one ramp member operably coupled to the mobile platform. The at least one ramp member is deflectable toward a ground surface so as to form a ramp responsive to contact with a subject vehicle wheel when the mobile platform resides on the ground surface. The ramp extends in a direction from the ground surface toward a top surface of the mobile platform.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
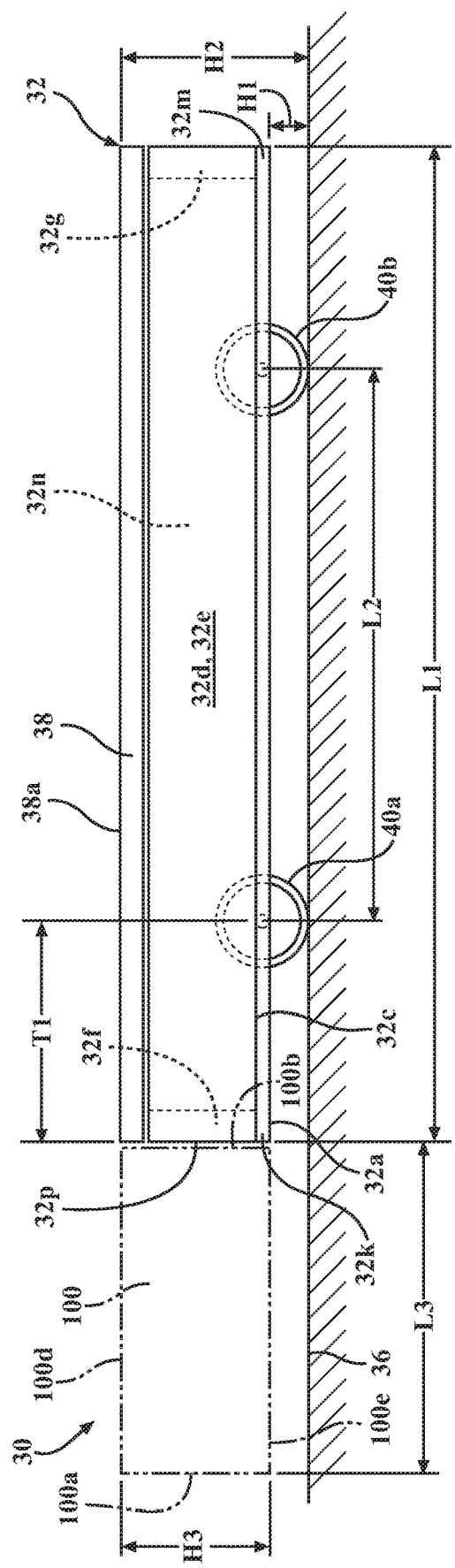
FIG. 1 is a schematic side view of a guided test platform in accordance with embodiments described herein.

In one or more arrangements described herein, a ramp structure for a mobile platform includes at least one ramp member structured to be operably coupled to the mobile platform. The at least one ramp member is structured to be deflectable toward a ground surface so as to form a ramp responsive to contact with a subject vehicle wheel when the ramp member is operably coupled to the mobile platform and the mobile platform resides on the ground surface. The ramp extends in a direction from the ground surface toward a top surface of the mobile platform. In certain embodiments, the ramp member(s) is a relatively rigid structure designed to rotate of otherwise deflect responsive to contact with the vehicle wheel. In other embodiments, the ramp member(s) is a relatively flexible structure designed to elastically or plastically deform responsive to contact with the vehicle wheel.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4C, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar elements appearing in different views have been given similar reference numerals. Also, numerous specific details are set forth in order to provide a thorough understanding of the embodiments described herein. However, it will be understood by those of ordinary skill in the art that the embodiments described herein can be practiced without these specific details.

FIG. 1 is a schematic side view of a guided test platform 30 in accordance with embodiments described herein. Referring to FIG. 1, the guided test platform 30 may be structured to enable a subject vehicle (not shown) to drive into and/or onto a top surface of the test platform without damage to either the subject vehicle or the test platform. The subject vehicle may be a conventional motor vehicle (such as a passenger sedan, for example). The guided test platform 30 may be structured to operate autonomously in the same environment as the subject vehicle, where the platform and the test vehicle may interact. For test purposes, a structure (not shown) simulating a vehicle chassis may be mounted onto a top surface of the guided test platform to create a "guided soft target" usable for testing subject vehicle sensors, warning systems, and occupant protection systems. This guided soft target may operate autonomously or under remote control so as to interact with subject vehicles in any of a variety of test scenarios. Alternatively, some or all operations of the guided test platform 30 may be controlled remotely, for example, by radio control from a remote station (not shown).

In embodiments described herein, the guided test platform 30 may include a mobile platform 32. Mobile platform 32 may include a base 32a. Base 32a may include a floor 32c. Opposed side walls 32d, 32e may extend from corresponding sides of floor 32c to form sides of the mobile platform 32. Walls 32d, 32e may be structured to enable attachment of ramp structures thereto, as described herein.

Opposed end walls 32f, 32g may extend from a front end 32k and a rear end 32m, respectively, of base 32a to form front and rear walls of the mobile platform 32. In combination, walls 32d, 32e, 32f, and 32g may form an interior cavity 32n of the mobile platform 32. Interior cavity 32n may be structured for receiving therein various systems and components dedicated to propelling, stopping, guiding and otherwise operating the guided test platform 30 as the platform 30 moves along a ground or road surface 36. In one or more arrangements, walls 32d, 32e, 32f, and 32g may be structured to extend vertically from floor 32c when the base 32a is resting on a level ground surface.

A cover 38 may be secured to edges of walls 32d, 32e, 32f, and 32g to enclose the interior cavity 32n and to provide a surface 38a along which a subject vehicle may be driven as described herein after contacting the guided test platform. Cover 38 is designed to enclose and protect the mobile platform systems and components contained in cavity 32n. Cover 38 may be attached to walls 32d, 32e, 32f, and 32g so as to be supported by the walls against a portion of the weight of a subject vehicle traveling along an outer or top surface 38a of the cover 38 when the guided test platform 30 resides on a ground or road surface, as shown in FIG. 1. When the guided test platform 30 is positioned on a ground or road surface 36, the cover outer surface 38a may form the top surface of the mobile platform 32. Cover 38 may be structured and attached to walls 32d, 32e, 32f, and 32g so as to support at least a portion of the weight of a subject vehicle with little or no deflection of the cover, and so that the cover 38 deflects elastically (if at all) responsive to the applied portion of the subject vehicle weight.

For testing purposes, a structure (not shown) simulating a vehicle chassis may be mounted onto the mobile platform top surface 38a to create a "guided soft target" usable for testing subject vehicle sensors, warning systems, and occupant protection systems. This guided soft target may operate autonomously or under remote control so as to interact with subject vehicles in any of a variety of test scenarios.

The mobile platform 32 may be suspended above the ground surface 36 by a plurality of wheels 40a, 40b. The wheels 40a, 40b may be mounted to the base 32a via wheel mountings (not shown) located inside the internal cavity 32n. The wheels 40a, 40b may extend through the base floor 32c to the base exterior via openings formed in the base floor 32c. The wheels 40a, 40b may include drive wheels designed to move or propel the guided test platform, and non-drive wheels. In one or more arrangements, all of the wheels 40a, 40b may be drive wheels designed to support the platform. In other arrangements, some of the wheels may be drive wheels and other wheels may be non-drive wheels. The drive wheels may be operably coupled to (or be incorporated into) a mobile platform propulsion system (not shown) structured to rotate the drive wheels to propel the guided test platform 30 along the ground surface 36. At least a portion of the mobile platform wheels 40a, 40b may be structured to be steerable by a mobile platform steering system (not shown), to guide the mobile platform 32 along the ground surface. The embodiment shown in FIG. 1 includes drive wheels 40b and non-drive, steerable wheels 40a. The term "operably coupled," as used throughout this description, can include direct or indirect connections, including connections without direct physical contact.

In one or more arrangements, the mobile platform wheels 40a, 40b may be mounted to the mobile platform base 32a so as to retract into the base openings responsive to application of a portion of the weight of a subject vehicle exerted on the mobile platform cover 38 when the subject vehicle rides along the cover 38. This may aid in preventing damage to the wheels 40a, 40b and other elements of the propulsion system due to loading by the subject vehicle. For example, the wheels 40a, 40b and associated wheel mountings may be structured to retract or recess into the base openings (and, optionally, into the base cavity 32n) responsive to application of a force on the wheel mountings exceeding a certain predetermined threshold. In one or more arrangements, the predetermined threshold force may be set high enough so that the wheels 40a, 40b retract into the base openings only when at least one wheel of the subject vehicle resides on the top surface 38a of the mobile platform 32. In one or more arrangements, the predetermined threshold force may be set low enough so that one or more of the wheels 40a, 40b retract into the base openings when the threshold force is due to a subject vehicle wheel riding up a ramp embodiment as described herein, in a direction toward the top surface 38a. In this embodiment, retraction of one or more of the wheels 40a, 40b may occur prior to a subject vehicle wheel contacting the cover top surface 38a.

Figure 2A:
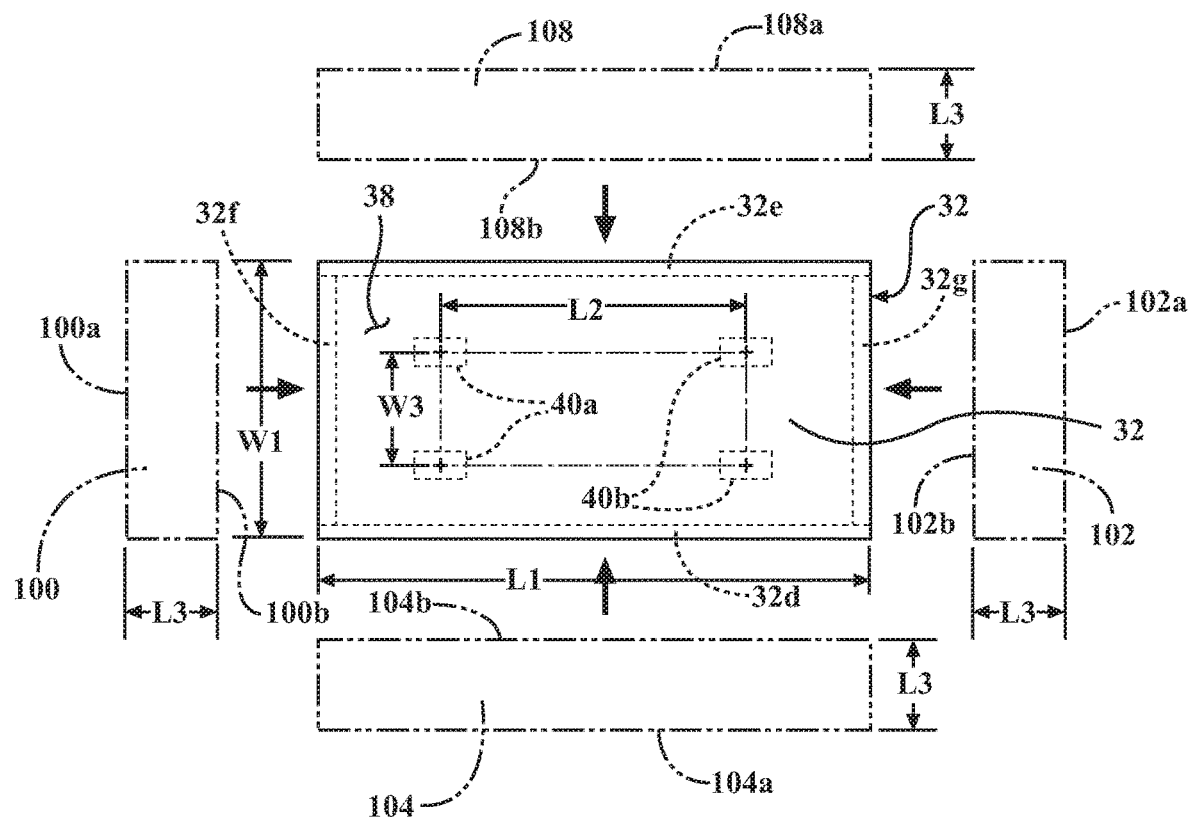
FIG. 2A is an exploded plan view showing how various ramp structures may be attached to different sides of the mobile platform of FIG. 1.
Figure 2B:
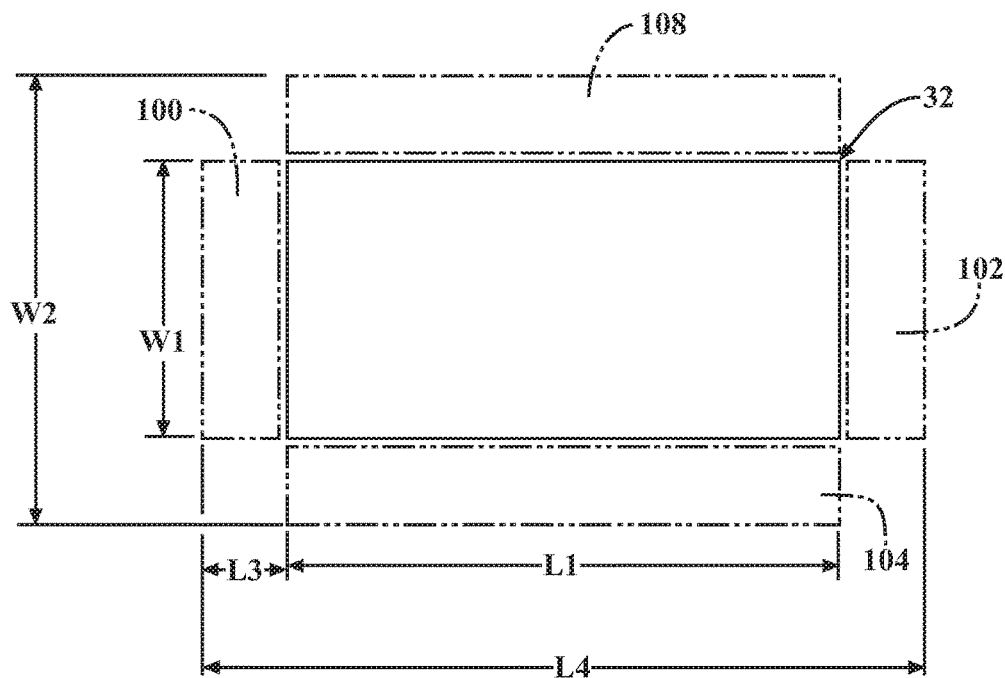
FIG. 2B illustrates various dimensions of a guided text platform incorporating ramp structures mounted on four sides of the mobile platform as shown in FIG. 2A.

Referring now to FIGS. 1-2B, the guided test platform 30 may also include one or more ramp structures coupled to one or more associated sides of the mobile platform 32. FIG. 1 shows schematically the attachment of a single ramp structure 100 to a front end 32p of the mobile platform 32. FIG. 2A is an exploded plan view showing how ramp structure 100 and various additional ramp structures 102, 104, 108 may be attached to different sides of the mobile platform 32 of FIG. 1. FIG. 2B illustrates various dimensions of a guided test platform incorporating ramp structures 100, 102, 104, 108 mounted on four sides of the mobile platform 32 as shown in FIG. 2A. Although different embodiments of the ramp structures are described herein, any embodiment of a ramp structure may be structured for attachment to any side of the mobile platform 32, and any side of the mobile platform may be structured for attachment of any embodiment of a ramp structure thereto. In addition, different embodiments of the ramp structures may be attached to associated different sides of the mobile platform 32, depending on the requirements of particular test scenarios.

Common characteristics of the ramp structures described herein will be described with reference to the ramp structure embodiment 100 shown in FIG. 1. Referring to FIG. 1, in one or more arrangements described herein, a ramp structure 100 may include a first end 100a and a second end 100b residing opposite the first end 100a. The ramp structure first end 100a may be an end spaced farthest from the mobile platform 32 and may be positioned to make initial contact with a wheel of a subject vehicle (not shown). The ramp structure second end 100b may be an end closest to the mobile platform 32 and may be mounted to a wall of the mobile platform 32. A first or upper surface 100d of the ramp structure 100 may extend between the first and second ends 100a, 100b and may be structured to face in an upward direction, away from ground surface 36 when the ramp structure is coupled to the mobile platform 32. A second or lower surface 100e of the ramp structure 100 may extend between the first and second ends 100a, 100b and may be structured to face in a direction toward ground surface 36 when the ramp structure is coupled to the mobile platform 32. In one or more arrangements, and depending on the configuration of the ramp structure and a height of the ramp structure above the ground surface 36 when mounted to the mobile platform 32, upper surface 100d may also (in combination with first end 100a) be positioned to make initial contact with a wheel of a subject vehicle.

As used herein, the term "ramp structure" refers to a structure which may be directly attached or otherwise coupled to a mobile platform and wherein at least a portion of the ramp structure may be deflectable and/or deformable to ascend or extend generally upwardly with respect to the ground surface 36 in a direction proceeding from the ramp structure first end 100a toward the ramp structure second end 100b when the ramp structure is mounted on a mobile platform 32 as described herein. The ramp structure may be structured to support the weight of a portion of a vehicle (as transmitted to the ramp structure through a rotating subject vehicle wheel or tire) and to guide a subject vehicle wheel from a ground or road surface upwardly toward the uppermost or top surface 38a of the mobile platform, along which the subject vehicle wheel may ride as it runs over the mobile platform 32.

As described herein, the ramp structures may be structured to (after contact of the ramp structure by a vehicle wheel) guide a wheel of a subject vehicle in a direction away from the ground surface 36 as the vehicle wheel moves along an upper surface 100d, in a direction extending from the ramp structure first end 100a toward the ramp structure second end 100b. When the ramp structure is coupled to a mobile platform positioned on the ground surface 36 as shown in FIG. 1, at least a portion of the ramp structure may be deflectable and/or deformable in a direction toward the ground surface 36 responsive to contact by a vehicle wheel. This may enable the vehicle wheel to ride upwardly along the upper surface 100d of the ramp structure toward the top surface 38a of the mobile platform 32.

In embodiments described herein, the ramp structure may include one or more ramp members structured to be operably coupled to the mobile platform. The ramp member(s) may be structured to be deflectable (and, optionally, deformable) toward the ground surface 36 so as to form a ramp, responsive to contact with a subject vehicle wheel 99 when the ramp member(s) is operably coupled to the mobile platform and the mobile platform resides on the ground surface. The ramp may extend in a direction from the ground surface toward a top surface of the mobile platform.

A ramp member is considered to be "deflectable" as described herein when at least the portion of the ramp member contacted by a rotating subject vehicle wheel may be moved from a pre-contact position (in which the ramp member resides prior to contact by the rotating subject vehicle wheel(s)) in a direction toward a ground surface on which the vehicle wheel is traveling, responsive to forces exerted by the rotating wheel on the ramp member. Thus, in embodiments, a deflectable ramp member may have relatively rigid structure which may not be visibly deformable under loading by the vehicle wheel. Rather, a position and/or orientation of the ramp member may change responsive to loading, without changing the physical shape of the ramp member.

As used herein, "deformable" means that the ramp structure or a ramp member forming a portion of the ramp structure may have a first, unloaded shape when coupled to (and supported by) the mobile platform 32 and prior to contact with a subject vehicle, and one or more second, different shapes resulting from forces exerted by the subject vehicle after contact with the subject vehicle. Depending on the ramp/ramp member structure and the material(s) from which the ramp/ramp member is formed, the ramp/ramp member may deform elastically (i.e., such that the ramp/ramp member will return to its original shape after removal of the force applied by the subject vehicle) or plastically (i.e., so that the ramp/ramp member will retain its deformed shape after removal of the force applied by the subject vehicle). Also, certain portions of the ramp/ramp member may deform elastically responsive to loading while other portions deform plastically responsive to loading.

The ramp structures described herein may be coupled to the mobile platform 32 using any method suitable for purposes described herein. For example, a ramp structure may have threaded inserts secured in an end thereof and structured for mounting to an associated mobile platform wall, and suitable bolts or studs may be used to attach the ramp structure to the mobile platform wall using the threaded inserts.

Figure 3A:
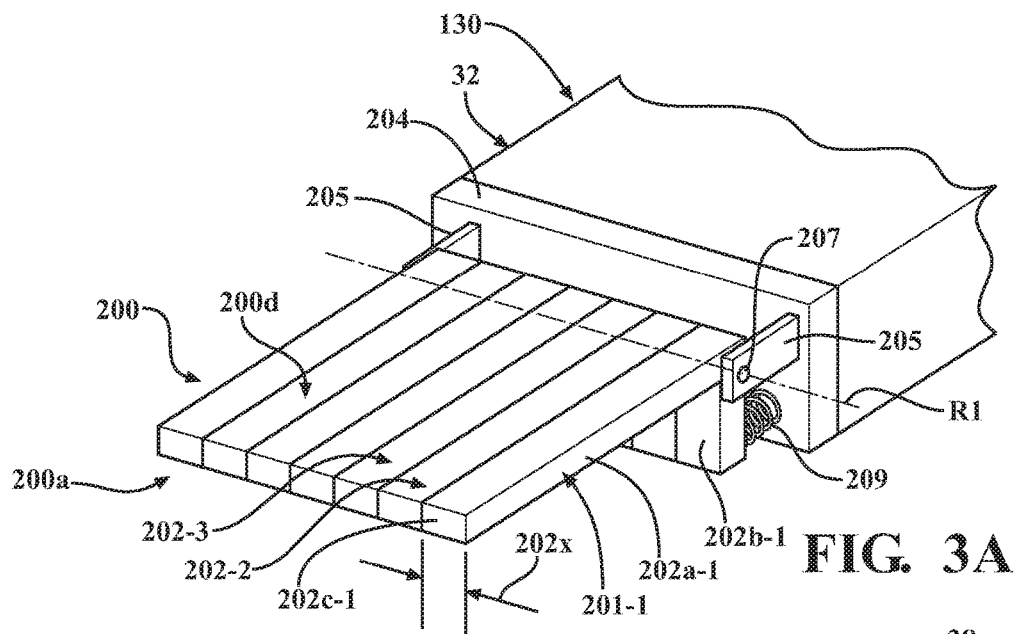
FIG. 3A is a schematic perspective view of a specific embodiment of a ramp structure for a mobile platform in accordance with an embodiment described herein.

FIG. 3A is a schematic perspective view of a specific embodiment of a ramp structure 200 for mobile platform 32 in accordance with an embodiment described herein. The ramp structure 200 is shown mounted to a wall of a mobile platform 32 and is shown prior to contact of the ramp structure 200 with a wheel of a subject vehicle. The ramp structure 200 may be coupled to the mobile platform 32 to provide an embodiment 130 of a guided test platform similar to platform 30 shown in FIGS. 1-2B.

Referring to FIG. 3A, in one or more arrangements, the ramp structure 200 may include a plurality of individually of independently deflectable ramp members 202 rotatably coupled to the mobile platform 32 by mounting the ramp members 202 to a mounting bracket 204, which is attached to the mobile platform 32 using, threaded inserts, for example. Ramp members 202 may include ramp members 202-1, 202-2, 202-3, etc. The mounting bracket 204 may form a portion of the ramp structure 200. Mounting of the ramp members 202 to the mounting bracket 204 may enable coupling of the ramp structure 200 to the mobile platform 32 by simply attaching the mounting bracket 204 to a side or wall of the mobile platform. The use of a mounting bracket 204 enables ramp structure 200 to be stored, transported, and coupled to the mobile platform 32 as a single unit.

In the embodiment shown in FIG. 3A, each ramp member 202 has an "L"-shaped configuration, with a first portion 202a and a second portion 202b extending from the first portion 202a. Ramp members 202-1, 202-2, 202-3, etc. may include associated first portions 202-1a, 202-2a, 202-3a, etc. Each ramp member first portion 202a may have a first end 202c structured for contacting the rotating wheel 99 of the subject vehicle. Individual ramp member first portions 202-1a, 202-2a, 202-3a, etc. may include associated first ends 202-1c, 202-2c, 202-3c, etc. Collectively, the ramp member first ends 202c may form a first end 200a of the ramp structure 200.

Each ramp member 202 may also have a surface 202d structured to form an upper surface of the ramp member when the ramp member 202 is coupled to the mobile platform 32. Collectively, the ramp member surfaces 202d may form an upper surface 200d of the ramp structure 200. Each individual ramp member 202 may also have an associated width dimension 202x.

Each ramp member 202 may be rotatably connected to the mounting bracket 204 near an intersection of the ramp member first portion 202a and the ramp member second portion 202b. In one or more arrangements, two or more mounting ears 205 may extend from the mounting bracket 204. The ramp members 202 may be rotatably mounted to the mounting bracket 204 by extending a shaft 207 through holes in the mounting ears 205 and also through holes formed in the ramp members 202. Alternatively, the mounting ears 205 may be directly attached to the mobile platform 32, thereby omitting the mounting bracket 204. Using the mounting ears, the ramp members 202 may be mounted to the mounting bracket 204 so as to be independently rotatable with respect to the mobile platform 32 about a common rotational axis R1 when the ramp structure 200 is coupled to the mobile platform 32.

Figure 3B:
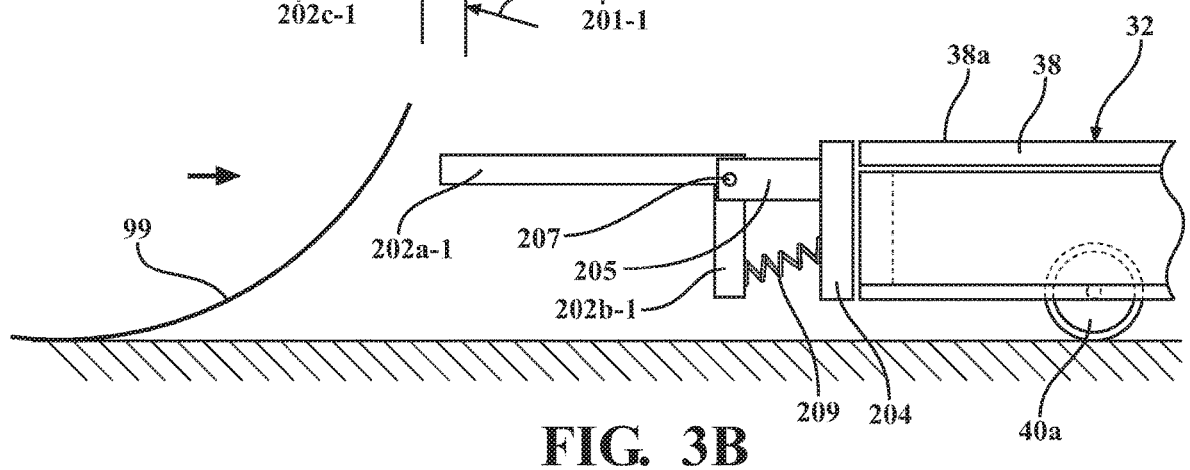
FIG. 3B is a schematic side view of the ramp structure shown in FIG. 3A, also showing a rotating subject vehicle wheel approaching a guided test platform including the ramp structure.

Each ramp member second portion 202b may also be in operative association with a spring member 209 attached to the mounting bracket 204. In one or more arrangements, each individual ramp member 202 may be associated with a dedicated individual spring member 209. Each spring member 209 may be spaced apart from the ramp member rotational axis R1. In particular embodiments, two or more of the individual ramp members 202 may be associated with a common one of spring members 209. The spring members 209 may bias one or more associated ramp member(s) 202 toward pre-contact orientations as shown in FIGS. 3A-3B. The ramp members 202 may reside in these pre-contact orientations prior to contact by the subject vehicle wheel(s) 99.

Figure 3C:
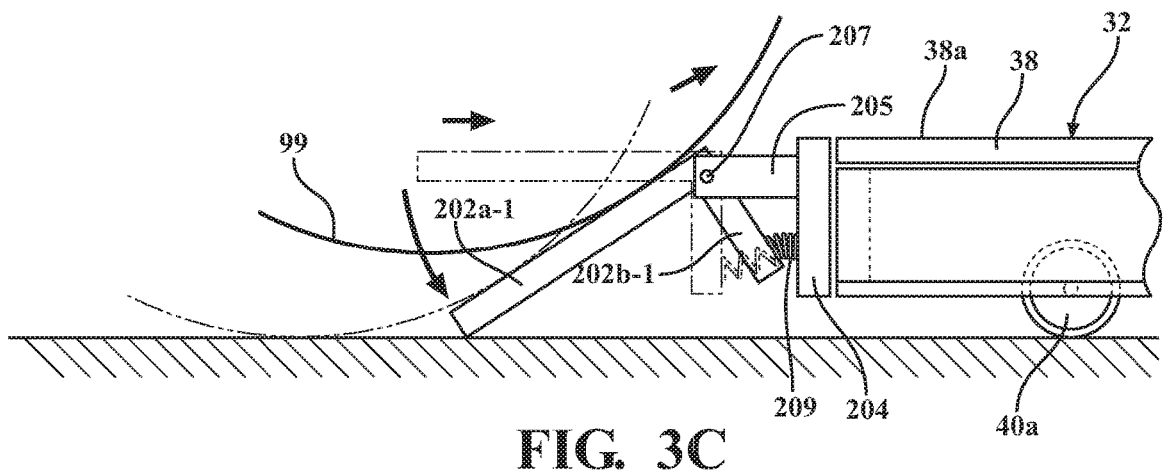
FIG. 3C shows deflection of one or more individual ramp members of the ramp structure of FIG. 3A after being contacted by the vehicle wheel 99.

FIG. 3B is a schematic side view of the ramp structure 200 shown in FIG. 3A, also showing a rotating subject vehicle wheel 99 approaching the guided test platform 130 including the ramp structure. The guided test platform 130 may also be moving in a direction toward the vehicle wheel 99. FIG. 3C shows deflection of one or more ramp members 202 after being contacted by the vehicle wheel 99.

Operation of the ramp structure 200 shown in FIGS. 3A-3C will now be discussed.

When the ramp structure 200 is mounted to the mobile platform 32, each ramp member 202 may be individually rotatable in a direction toward the ground surface 36 so as to form a portion of a ramp, responsive to contact of the ramp member by a subject vehicle wheel 99. Referring to FIG. 3C, when the subject vehicle wheel 99 contacts an end 202c of a ramp member first portion 202a, the wheel may force the ramp member first portion end to deflect or rotate as shown in a direction toward the ground surface 36. Thus, rotation of each ramp member 202 in the direction toward the ground surface 36 to form the ramp may cause the ramp member to compress an associated spring member 209 so as to resist the rotation of the ramp member.

The end 202c of the ramp member first portion 202a may deflect until it contacts the ground surface 36, thereby forming a portion of a ramp extending in a direction D1 heading from the ground surface 36 toward a top surface of the mobile platform 32 (for example, the top surface 38a of the mobile platform cover 38). Multiple adjacent ramp members 202 may be deflected in this manner by a single vehicle wheel 99, depending on the relative width dimensions of the ramp members 202 and the vehicle wheel 99. In addition, different, spaced-apart vehicle wheels 99 may contact and deflect different associated spaced-apart ramp members or groups of ramp members 202. The subject vehicle wheel(s) 99 may then proceed up the ramp formed by the deflected ramp member first portion(s) 202a. During movement of the wheel(s) 99 up the ramp, the ramp member(s) 202 are supported by the rotational connections to the mounting bracket 204 along axis R1 and by contact with the ground surface 36. After the vehicle wheel(s) 99 have ascended the ramp and are out of contact with the ramp member(s), the spring member(s) 209 may force the ramp members 202 to rotate back to their pre-contact configurations as shown in FIGS. 3A-3B.

In one or more arrangements, the width dimensions 202x of all of the ramp members 202 are equal. In other arrangements, the width dimensions of different ramp members may vary.

In one or more arrangements, the ramp member width dimensions 202x may be specified so as to be less than a width of a vehicle wheel having a predetermined width. In such arrangements, a single vehicle wheel 99 may deflect multiple ramp members 202 upon contact with the ramp structure 200.

In one or more particular arrangements, one or more of the ramp member width dimensions 202x are specified so as to be at least as wide as a vehicle wheel having a predetermined width. This may enable a single ramp member 202 to deflect to form a ramp portion supporting a single associated vehicle wheel 99, rather than the vehicle wheel deflecting multiple ramp members 202 upon contact with the ramp structure 200.

Figure 4A:
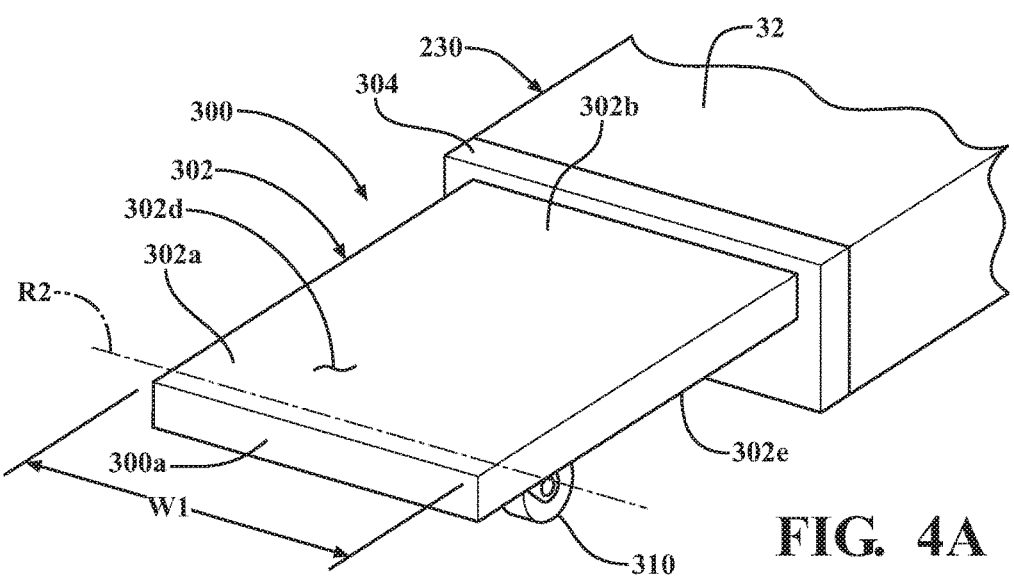
FIG. 4A is a schematic perspective view of a ramp structure for a mobile platform in accordance with another embodiment described herein, shown prior to contact of the ramp structure with a wheel of a subject vehicle.
Figure 4B:
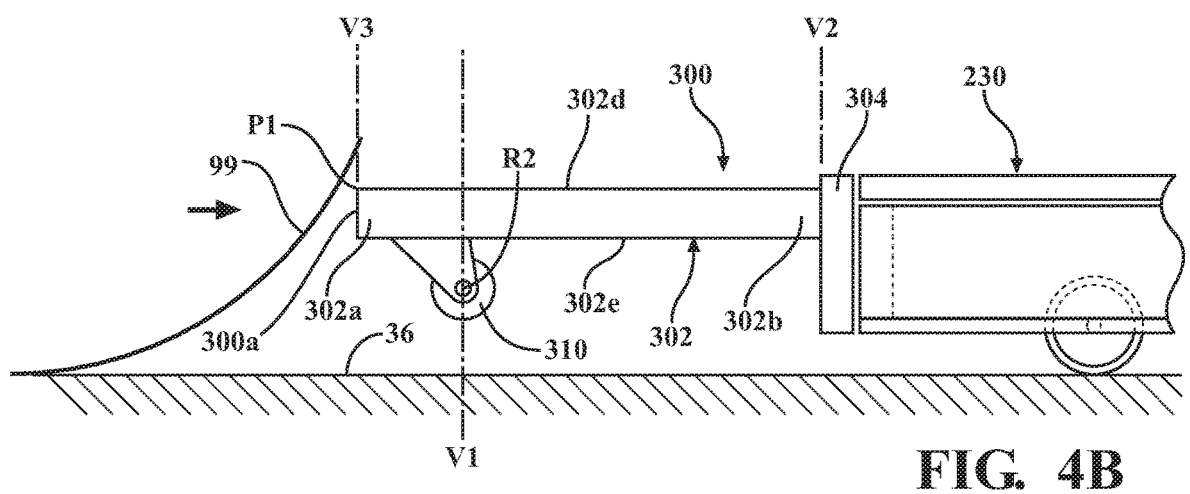
FIG. 4B is a schematic side view of the ramp structure shown in FIG. 4A, also showing a rotating subject vehicle wheel approaching a guided test platform including the ramp structure of FIG. 4A.

FIG. 4A is a schematic perspective view of a ramp structure 300 for a mobile platform in accordance with another embodiment described herein, shown prior to contact of the ramp structure 300 with a wheel of a subject vehicle. FIG. 4B is a schematic side view of the ramp structure shown in FIG. 4A, also showing a rotating subject vehicle wheel 99 approaching a guided test platform 230 including the ramp structure 300. The guided test platform 230 may also be moving in a direction toward the vehicle wheel 99.

Referring to FIG. 4A, in one or more arrangements, the ramp structure 300 may include a ramp member 302 coupled to the mobile platform 32 by mounting the ramp member to a mounting bracket 304, which may be attached to the mobile platform 32 using threaded inserts, for example. The ramp member 302 may extend in cantilever fashion from the mounting bracket 304. The mounting bracket 304 may form a portion of the ramp structure 300. Mounting of the ramp member 302 to the mounting bracket 304 may enable coupling of the ramp structure to the mobile platform 32 by simply attaching the mounting bracket 304 to a side or wall of the mobile platform. The use of a mounting bracket 304 enables ramp structure 300 to be stored, transported, and coupled to the mobile platform as a single unit. Alternatively, the ramp member 302 may be directly bolted or otherwise attached to the mobile platform 32.

In the embodiment shown in FIG. 4A, ramp member 302 may have a first, free end portion 302a structured to be contacted by the wheel of a subject vehicle. The ramp member may also have a second end portion 302b positioned opposite the first end portion 302a and attached to the mounting bracket 304. The ramp member 302 may be structured to be deformable in a direction toward the ground surface 36 so as to form a ramp for the vehicle responsive to contact of the ramp member first end portion 302a by the wheel of the subject vehicle, when the ramp member 302 is operably coupled to the mobile platform 32. To this end, the ramp member 302 may be formed from a hard rubber or other relatively flexible material. Ramp member first end 302a may form a first end 300a of the ramp structure 300. Ramp member 302 may also have a first surface 302d extending between first end 300a and second end 300b structured to form an upper surface of the ramp member when the ramp member 302 is coupled to the mobile platform 32. Ramp member first surface 302d may also form a first surface of the ramp structure 300. A second or lower surface 302e of the ramp member 302 may be structured to face in a direction toward ground surface 36 when the ramp structure 300 is coupled to the mobile platform 32.

In addition, the ramp structure 300 may include at least one roller element 310 directly attached or otherwise coupled to the ramp member 302 along the ramp member lower surface 302e. The ramp structure may incorporate multiple roller elements 310 to support a width W1 of the ramp member 302 sufficient to accommodate a track width of the test vehicle.

Referring to FIG. 4A, each of the roller element(s) 310 may be coupled to the ramp member 302 such that a vertical plane V1 extending through an axis of rotation R2 of the roller elements resides between a vertical plane V2 extending through a location of attachment of the ramp member 302 to the mounting bracket 304 (or to the mobile platform 32), and a vertical plane V3 extending through a projected first point of contact P1 between the ramp member 302 and the moving vehicle wheel. This arrangement is designed to ensure that the initial loading of the ramp member first end 302a by the vehicle wheel 99 will cause the wheel to roll in a direction D2 (FIG. 4B) toward the mobile platform. This positioning of the roller element(s) 310 also enables the ramp member first end 302a to overlap or overhang the roller element axis R2 so that the end 302a may continue to move toward the ground surface 36 as the roller element(s) 310 rolls toward the mobile platform 32.

In one or more arrangements, the ramp member first end 302a may continue to move toward the ground surface 36 as the roller element(s) 310 move toward the mobile platform, until the ramp member first end 302a comes into contact with the ground surface 36. In this manner, a ramp may be formed supported from below by the roller element(s) 310.

Operation of the ramp structure shown in FIGS. 4A-4C will now be discussed.

Figure 4C:
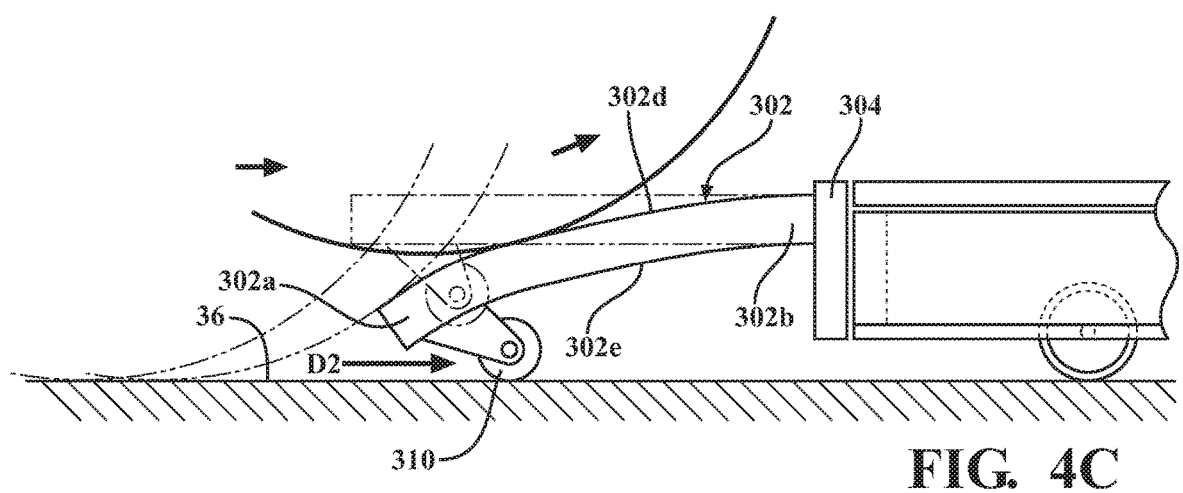
FIG. 4C is the view of FIG. 4B showing deformation of the ramp structure after contact with a wheel of a test vehicle.

FIG. 4C is the view of FIG. 4B showing deformation of the ramp member 302 after contact with the vehicle wheel 99. Referring to FIGS. 4B and 4C, when the subject vehicle wheel 99 contacts the first end 302a of the ramp member 302, the wheel may force the ramp member first end to deflect or rotate as shown in a direction toward the ground surface 36. Roller element(s) 310 may then contact the ground surface 36 and proceed to roll in the direction D2 toward the mobile platform 32. As the roller element(s) 310 roll toward the mobile platform 32, the first end 302a of the ramp member 302 may continue deforming until it contacts the ground surface 36, thereby forming a ramp extending in the direction D2 and heading from the ground surface 36 toward the top surface of the mobile platform (for example, the top surface 38a of the mobile platform cover 38). The subject vehicle wheel(s) 99 may then proceed up the ramp formed by the ramp member 302 as shown in FIG. 4C.

The roller element(s) and the ground surface 36 support the ramp member first end 302a against the forces exerted by the subject vehicle wheel(s) 99, and the remainder of the ramp is supported by and suspended between the mounting bracket 304 and the roller element(s) 310. The location(s) of the roller element(s) 310 along the ramp member 302 may be varied as desired to provided more support to different portions of the ramp. In addition, as stated previously, more than one roller element may be attached to the ramp member 302 to support the ramp member at associated multiple locations between the ramp member first end 302a and the mounting bracket 304.

Referring again to FIGS. 1-2B, the various dimensions of the mobile platform 32 and the ramp structure embodiments 200-300 described herein may be specified so as to aid in preventing the guided test platform 30 from tilting upwardly and striking an undercarriage of the subject vehicle responsive to pressure by the subject vehicle wheels and also to facilitate movement of the subject vehicle wheel(s) up the various ramp structures and onto the cover top surface 38a. For example, referring to FIGS. 1-2B, the dimension L1 (i.e., a total length of the mobile platform 32 without any ramp structures mounted thereto) may be specified so as to be about 80 inches plus or minus 3 inches. The dimension L2 (a distance between rotational axes of the steerable wheels 40a and the drive wheels 40b) may be specified so as to be about 71 inches plus or minus 3 inches. The dimension L3 (a length of an exemplary ramp structure) may be specified so as to be about 17 inches plus or minus 3 inches. The dimension L4 (i.e., a total length of the guided test platform including ramp structures with a ramp structure mounted to each end of the mobile platform 32) may be specified so as to be greater than or equal to the wheelbase of a typical subject vehicle (i.e., the distance from the centerline of the front axle to the centerline of the rear axle of the subject vehicle). In particular embodiments, the dimension L4 may be selected to be about 116 inches plus or minus 3 inches.

The dimension H1 (a ground clearance of the mobile platform 32 and ramp structures with ramp structures mounted on the mobile platform 32) may be specified so as to be about 0.75 inches plus or minus 0.1 inches. The dimension H2 (a distance of the mobile platform top surface 38a to the ground surface 36) may be specified so as to be about 4.1 inches plus or minus 0.3 inches. The dimension H3 (an overall height or thickness of a space envelope occupied by an exemplary ramp structure) may be specified so as to be about 3.7 inches plus or minus 0.3 inches. The dimension T1 (a distance from a front end 32p of the mobile platform 32 to the rotational axis of the steerable wheels 40a) may be specified so as to be about 5.5 inches plus or minus 2 inches. The dimension W1 (i.e., a total width of the mobile platform 32 without any ramp structures mounted thereto, and a maximum width dimension of an exemplary ramp structure mounted to a front end 32p or a rear end of the mobile platform 32 opposite the front end) may be specified so as to be about 30 inches plus or minus 3 inches. The dimension W2 (an overall width of the guided test platform 30 with ramp structures mounted along each side of the mobile platform 32) may be specified so as to be about 66 inches plus or minus 3 inches. The dimension W3 (a distance between adjacent steerable wheels 40a and between adjacent drive wheels 40b) may be specified so as to be about 24 inches plus or minus 3 inches. Thus, when all of the ramp structures in FIG. 2B are attached to the mobile platform 32 as shown, an overall width dimension of the guided test platform 30 may be equal to W2, and an overall length dimension of the guided test platform 30 may be equal to L4.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A ramp structure for a mobile platform, the ramp structure comprising at least one ramp member operably coupled to the mobile platform and structured to be deformable in a direction toward the ground surface so as to form a ramp responsive to contact of the at least one ramp member with a subject vehicle wheel when the at least one ramp member is operably coupled to the mobile platform and the mobile platform resides on the ground surface, the ramp extending in a direction from the ground surface toward a top surface of the mobile platform, wherein the at least one ramp member has an end portion structured to be contacted by the subject vehicle wheel and at least one roller element connected to the at least one ramp member end portion, wherein the at least one ramp member is structured to be deformable so as to enable the at least one roller element to contact the ground surface responsive to contact of the end portion by the subject vehicle wheel, and wherein the at least one roller element is structured to roll along the ground surface in a direction toward the mobile platform while supporting the at least one ramp member end portion as the at least one ramp member end portion is deflected toward the ground surface responsive to contact of the at least one ramp member end portion by the subject vehicle wheel, when the at least one ramp member is operably coupled to the mobile platform.

2. The ramp structure of claim 1 further comprising a mounting bracket structured to be attached to the mobile platform, and wherein each ramp member is coupled to the mounting bracket.

3. A guided test platform comprising:
   the mobile platform in accordance with claim 1; and
   a ramp structure in accordance with claim 1 operably coupled to the mobile platform.

4. A guided test platform comprising mobile platform and a ramp structure including a plurality of ramp members operably coupled to the mobile platform, each ramp member being structured to be individually rotatable about a common rotational axis toward a ground surface so as to form a portion of a ramp responsive to contact with the subject vehicle wheel when the mobile platform resides on the ground surface, the ramp extending in a direction from the ground surface toward a top surface of the mobile platform, the ramp structure further comprising at least one spring member spaced apart from the rotational axis and structured to resist a rotation of each ramp member toward the ground surface to form the portion of the ramp, and wherein the rotation of each ramp member toward the ground surface to form the portion of the ramp causes the ramp member to compress the at least one spring member so as to resist the rotation of the ramp member.

\* \* \* \* \*